United States Patent [19]

Nosu et al.

[11] Patent Number: 5,252,645
[45] Date of Patent: Oct. 12, 1993

[54] ANTISTATIC, THERMALLY STABILIZED HALOGEN-CONTAINING RESIN COMPOSITION

[75] Inventors: Tsutomu Nosu; Yoshiyuki Nagae, both of Kagawa, Japan

[73] Assignee: Kyowa Chemical Industry Co., Ltd., Kagawa, Japan

[21] Appl. No.: 802,280

[22] Filed: Dec. 4, 1991

[30] Foreign Application Priority Data

Dec. 5, 1990 [JP] Japan ................... 2-405390

[51] Int. Cl.$^5$ .......................... C08K 5/57; C08K 5/09; C08K 5/07
[52] U.S. Cl. ..................... 524/180; 524/181; 524/182; 524/357; 524/400; 524/436; 524/399; 524/437; 524/913
[58] Field of Search .............. 524/436, 437, 357, 180, 524/181, 182, 399, 400, 913

[56] References Cited

U.S. PATENT DOCUMENTS

| | | | |
|---|---|---|---|
| 3,005,793 | 10/1961 | Wagner | 524/913 |
| 3,117,113 | 1/1964 | Tudor | 524/913 |
| 3,150,120 | 9/1964 | Perrins | 524/913 |
| 3,216,957 | 11/1965 | Krumm | 524/913 |
| 4,427,816 | 1/1984 | Aoki et al. | 524/357 |
| 4,675,356 | 6/1987 | Miyata | 524/436 |
| 4,861,816 | 8/1989 | Kobayashi et al. | 524/436 |

FOREIGN PATENT DOCUMENTS 0246867 11/1987 European Pat. Off. .
60-221442 11/1985 Japan .

OTHER PUBLICATIONS

Oguma et al., Chemical Abstracts, vol. 111, No. 8, Aug. 21, 1989 Abstract No. 59036e.
Sankyo, World Patents Index Latest, AN87-012639, Dec. 2, 1986.
Kokaku, World Patents Index Latest, AN89-080545, Feb. 2, 1989.

*Primary Examiner*—Veronica P. Hoke
*Attorney, Agent, or Firm*—Wenderoth, Lind & Ponack

[57] ABSTRACT

A halogen-containing resin composition containing 100 parts by weight of a halogen-containing resin, 0.01 to 10 parts by weight of a hydrotalcite, 0.01 to 10 parts by weight of a perchloric acid ion-containing hydrotalcite, and 0.01 to 5 parts by weight of at least one member selected from a $\beta$-diketone compound, an organic acid metal salt and an organic tin compound, the resin composition being thermally stabilized against heat treatment and sun light and being improved in antistatic properties.

8 Claims, No Drawings

ANTISTATIC, THERMALLY STABILIZED HALOGEN-CONTAINING RESIN COMPOSITION

FIELD OF THE INVENTION

The present invention relates to an antistatic, thermally stabilized halogen-containing resin composition. More specifically, it relates to a halogen-containing resin composition which is thermally stabilized and imparted with the capability of preventing static electricity by incorporating specific amounts of hydrotalcite, perchloric acid ion-containing hydrotalcite, a $\beta$-diketone compound, etc.

PRIOR ART OF THE INVENTION

Halogen-containing resins are inherently thermally unstable. For example, halogen-containing resins undergo a decomposition reaction based mainly on dehydrohalogenation due to heat when molded, an increase in the surface temperature due to sunlight when used or the like. For this reason, articles formed therefrom suffer a decrease in mechanical properties and deterioration in color tones. Further, as an antistatic agent, a cationic surfactant or an amphoteric surfactant is generally incorporated into halogen-containing resins. In this case, the dehydrohalogenation is furthered due to heat during the molding of said resins, heat of sunlight, etc., and the article quality is degraded. Moreover, since these surfactants are chemically active, they react with hydrochloric acid generated by pyrolysis to nullify or decrease the antistatic properties.

J-P-A-59-152941, J-P-A-59-157035 and JP-A-59-209644 disclose the use of hydrotalcites as an agent to catch a halogen dissociated from halogen-containing resins under dehydrohalogenation. Hydrotalcites have excellent capability of catching halogens, and further have the following advantages. Hydrotalcites take halogens into their structures and further, they are nontoxic. Even when hydrotalcites are used, an antistatic agent is generally incorporated. As an antistatic agent, cationic or amphoteric surfactants are generally preferred. These antistatic agents per se exhibit excellent antistatic properties. However, the defect with these antistatic agents is that they are inferior in dispersibility in, and compatibility with, halogen-containing resins. Further, these antistatic agents are poor in heat resistance and have the capability of promoting the decomposition of halogen-containing resins. Therefore, the static electricity resistance and thermal stability of articles molded from halogen-containing resins containing these antistatic agents have not been fully satisfactory.

J-P-A-59-105037 and J-P-A-60-181142 disclose an antistatic plasticizer in order to overcome the defect that the above antistatic agents are inferior in compatibility and dispersibility. This plasticizer, which is required for processing halogen-containing resins, has antistatic performance imparted. However, the antistatic performance thereof has not been fully satisfactory.

SUMMARY OF THE INVENTION

It is an object of the present invention to provide a halogen-containing resin composition having excellent thermal stability and excellent antistatic properties.

It is another object of the present invention to provide a halogen-containing resin composition which is free from degradation in mechanical properties and deterioration in color tone caused by heat treatment during the processing thereof, sunlight, etc.

According to the present invention, there is provided an antistatic, thermally stabilized halogen-containing resin composition containing 100 parts by weight of a halogen-containing resin, 0.01 to 10 parts by weight of a hydrotalcite, 0.01 to 10 parts by weight of a perchloric acid ion-containing hydrotalcite, and 0.01 to 5 parts by weight of at least one member selected from a $\beta$-diketone compound, an organic acid metal salt and an organic tin compound.

DETAILED DESCRIPTION OF THE INVENTION

The present inventors have found that perchloric acid ion-containing hydrotalcites have antistatic properties and further that halogen-containing resins containing a cationic surfactant, if such a hydrotalcite is incorporated, do not suffer degradation in mechanical properties and deterioration in color tone even when treated under heat. A cationic or amphoteric surfactant contained in a halogen-containing resin as an antistatic agent is decomposed due to heat during the processing of the resin, heat of sunlight, etc., to generate an amine compound. The present inventors assumed that the dehydrohalogenation is promoted by this amine compound, and attempted to inactivate the amine compound with a perchloric acid ion-containing hydrotalcite, which attempt has led to success. That is, the thermal stability and photo-stability of halogen-containing resins are remarkably increased. It is assumed that the amine compound is inactivated by a perchloric acid ion-containing hydrotalcite and halogen generated by pyrolysis is caught in the layers of the hydrotalcite by ion-exchange.

Examples of the halogen-containing resin used in the present invention are resins such as polyvinyl chloride, polyvinyl bromide, polyvinyl fluoride, polyvinylidene chloride, polyethylene chloride, polypropylene chloride, polyethylene bromide, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-acrylonitrile copolymer, a vinyl chloride-butadiene copolymer, a vinyl chloride-propylene chloride copolymer, a vinyl chloride-vinylidene chloride-vinyl acetate terpolymer, a vinyl chloride-maleic acid ester copolymer, a vinyl chloride-methacrylic acid copolymer, a vinyl chloride-methacrylic acid ester copolymer, a vinyl chloride-acrylonitrile copolymer and internally plasticized polyvinyl chloride; and blends of the above resins and $\alpha$-olefin polymers of polyethylene, polypropylene, etc., polyolefins such as an ethylene-propylene copolymer, etc., polystyrene, an acrylic resin, a copolymer of styrene and other monomer, an acrylonitrile-butadiene-styrene copolymer and a methacrylic acid ester-butadiene-styrene copolymer.

In the present invention, the foregoing objects and advantages are achieved by utilizing the thermal stability imparted by hydrotalcite and the antistatic properties imparted with perchloric acid ion-containing hydrotalcite. Further, there is used a specified amount of at least one component selected from a $\beta$-diketone, an organic acid salt of a metal and an organic tin compound in combination with the hydrotalcites in order to prevent the coloring caused by the hydrotalcites.

The hydrotalcite used in the present invention has the following formula, $$M^{2+}{}_{(1-x)}Al_x(OH)_2CO_{3(x/2)}\cdot mH_2O$$

wherein $M^{2+}$ is $Mg^{2+}$ and/or $Zn^{2+}$, x is defined by $0.1<x<0.5$, preferably by $0.2\leq x\leq 0.4$, particularly preferably by $0.25\leq x\leq 0.35$, and m is defined by $0\leq m<1$.

As disclosed in J-P-A-55-80445, hydrotalcites are excellent with regard to thermal stability and transparency. The halogen-containing resin is further improved in thermal stability and non-coloring properties by incorporating at least one compound selected from an organic acid metal salt of zinc, lead, cadmium, calcium, barium, strontium, etc., an organic tin compound and a β-diketone compound. The amount of the hydrotalcite for use per 100 parts by weight of the halogen-containing resin is 0.01 to 10 parts by weight, preferably 0.1 to 5 parts by weight. When the above amount is less than 0.01 part by weight, no sufficient thermal stability can be obtained. When the amount exceeds 10 parts by weight, undesirably, the torque during the molding of the resin increases, and a colored molded article is obtained.

The perchloric acid ion-containing hydrotalcite used in the present invention has the following formula, $$M^{2+}{}_{(1-x)}Al_x(OH)_2(CO_3)_y(ClO_4)_z\cdot mH_2O$$

wherein $M^{2+}$ is $Mg^{2+}$ and/or $Zn^{2+}$, and x, y, z and m are positive numbers satisfying the following formulae, $0<x<0.5$, preferably $0.2\leq x\leq 0.4$, $0\leq y<0.25$, preferably $0\leq y\leq 0.20$, $0<z\leq 0.5$, preferably $0.04\leq z\leq 0.4$, $2y+z=x$, and $0\leq m<1$.

The perchloric acid ion-containing hydrotalcite imparts the halogen-containing resin with antistatic properties. When the halogen-containing resin contains a surfactant, the perchloric acid ion-containing hydrotalcite also prevents the deterioration of the thermal stability caused by the surfactant. The amount of the perchloric acid ion-containing hydrotalcite for use per 100 parts by weight of the halogen-containing resin is 0.01 to 10 parts by weight, preferably 0.1 to 5 parts by weight. When the above amount is less than 0.01 part by weight, no sufficient antistatic properties can be obtained. When it exceeds 10 parts by weight, undesirably, the resin viscosity increases and it is difficult to process the resin. The perchloric acid ion-containing hydrotalcite is disclosed in J-P-B-51-20997 and J-P-B-2-36143, and it should be understood that the concerned disclosure constitutes part of the present specification.

The β-diketone compound has the following formula, $$R_1\text{-CO-CHR}_2\text{-CO-R}_3$$

wherein each of $R_1$ and $R_3$ is independently a linear or branched alkyl or alkenyl group having up to 30 carbon atoms, an alkyl group having 7 to 36 carbon atoms, or an aryl or alicyclic group having less than 14 carbon atoms with the proviso that the alicyclic group my contain a carbon-carbon double bond, one of $R_1$ and $R_3$ may be a hydrogen atom, and $R_2$ is a hydrogen atom, an alkyl group or an alkenyl group. The β-diketone compound prevents the coloring caused by the hydrotalcites when the halogen-containing resin is processed. The amount of the β-diketone compound for use per 100 parts by weight of the halogen-containing resin is 0.01 to 5 parts by weight, preferably 0.1 to 1 part by weight. When the above amount is less than 0.01 part by weight, no sufficient effect of preventing the coloring can be obtained. Even when it exceeds 5 parts by weight, the effect of preventing the coloring is not improved any further, and such an excess amount is not economical.

Examples of the β-diketone compound are dehydroacetic acid, dehydropropionylacetic acid, dehydrobenzoylacetic acid, cyclohexan-1,3-dione, dimedone, 2,2'-methylenebiscyclohexan-1,3-dione, 2-benzylcyclohexan-1,3-dione, acetyltetralone, palmitoyltetralone, stearoyltetralone, benzoyltetralone, 2-acetylcyclohexanone, 2-benzoylcyclohexanone, 2-acetylcyclohexanon-1,3-dione, benzoyl-p-chlorobenzoylmethane, bis(4-methylbenzoyl)methane, bis(2-hydroxybenzoyl)methane, benzoylacetylmethane, tribenzoylmethane, diacetylbenzoylmethane, stearoylbenzoylmethane, palmitoylbenzoylmethane, dibenzoylmethane, 4-methoxybenzoylbenzoylmethane, bis (3,4-methylenedioxybenzoyl)methane, benzoylacetyloctylmethane, benzoylacetylphenylmethane, stearoyl-4-methoxybenzoylmethane, bis(4-tert-butylbenzoyl)methane, benzoylacetylethylmethane, benzoyltrifluoroacetylmethane, diacetylmethane, butanoylacetylmethane, heptanoylacetylmethane, triacetylmethane, distearoylmethane, stearoylacetylmethane, palmitoylacetylmethane, lauroylacetylmethane, benzoylformylmethane, acetylformylmethylmethane, benzoylphenylacetylmethane and bis(cyclohexanoyl)methane. Further, there may be used salts of these β-diketone compounds with metals such as lithium, sodium, potassium, magnesium, calcium, barium, zinc, zirconium, tin and aluminum. Particularly preferred are stearoylbenzoylmethane and dibenzoylmethane.

The organic acid salt of a metal has an effect of preventing the coloring caused by the hydrotalcites. The amount of the organic acid salt of a metal for use per 100 parts by weight of the halogen-containing resin is 0.01 to 5 parts by weight, preferably 0.1 to 5 parts by weight. When the above amount is less than 0.01 part by weight, no sufficient effect can be obtained. When this amount exceeds the above upper limit, the resin knitting performance is poor and undesirably, plate-out or bleedout sometimes occurs. The metal constituting the organic acid salt of a metal is selected from zinc, lead, cadmium, calcium, barium, strontium, etc., and zinc is particularly preferred. An organic acid salt of zinc and an organic acid salt of other metal may be used in combination.

The organic acid which constitutes the organic acid salt of a metal is selected from monocarboxylic acids such as acetylacetic acid, propionic acid, butyric acid, valeric acid, caproic acid, enathic acid, caprylic acid, neodecanoic acid, 2-ethylhexlic acid, pelarogonic acid, capric acid, undecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, cuminic acid, n-propylbenzoic acid, aminobenzoic acid, N,N-dimethylbenzoic acid, actoxybenzoic acid, salicylic acid, p-tert-octylsalicylic acid, oleic acid, elaidic acid, linoleic acid, linolenic acid, thioglycolic acid, mercaptopropionic acid and octylmercaptopropionic acid; dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, oxophthalic acid, chlorophthalic acid, aminophthalic acid, maleic acid, fumaric acid, citraconic acid, itaconic acid, aconitic acid and thiodipropionic acid, and monoesters and monoamides of these dicarboxylic acids; and tri- and tetracarboxylic acids such as hemimellitic acid, trimellitic acid, mellophanic acid, pyromellitic acid and mellitic acid, and di- or triesters of these tri- or tetracarboxylic acids.

The organic tin compound has an effect of preventing the coloring caused by the hydrotalcites. The amount of the organic tin compound for use per 100 parts by weight of the halogen-containing resin is 0.01 to 5 parts by weight, preferably 0.1 to 3 parts by weight. When the above amount is less than 0.01 parts by weight, no intended effect can be obtained. When it exceeds 5 parts by weight, undesirably, bleedout sometimes occurs.

The organic tin compound is selected, for example, from mono or dialkyltin laurates such as mono- or dimethyltin tri- or dilaurate, mono- or dibutyltin tri- or dilaurate and mono- or dioctyltin tri- or dilaurate; mono-or dialkyltin maleates such as mono- or dimethyltin maleate polymer, mono- or dibutyltin maleate polymer, mono- or dimethyltin tris- or bisisooctylmaleate, mono- or dibutyltin tris- or bisisooctylmaleate and mono- or dioctyltin tris- or bisisooctylmaleate; mono- or dialkyltin thioglycolates such as mono- or dimethyltin tris- or bisisooctylthioglycolate, mono- or diocyltin tris- or bisisoocytylthioglycolate, mono-or dibutyltin tris- or bisthioglycolate, mono- or dimethyltin thioglycolate (or 2-mercaptopropionate), mono-or dibutyltin thioglycolate (or 2-mercaptopropionate) and mono- or dioctyltin thioglycolate (or 2-mercaptopropionate); and mono- or dialkyltin mercaptides such as mono- or dimethyltin tri- or didodecylmercaptide, mono- or dibutyltin tri- or didodecylmercaptide, mono- or dioctyltin tri- or didodecylmercaptide, mono- or dimethyltin sulfide, dioctyltin sulfide, didodecyltin sulfide, mono- or dimethyl, butyl or octyltin tris- or bis-2-mercaptoethyloleate, thiobis[monomethyltin bis(2-mercaptoethyloleate)], thiobis[dimethyl, dibutyl or dioctyltin mono(2-mercaptoethyloleate] and mono- or dioctyltin-s,s'-bis(isooctylmercaptoacetate).

The halogen-containing resin composition of the present invention may contain a surfactant as an antistatic agent. The surfactant may be anionic, nonionic, cationic and amphoteric. The present invention produces a remarkable effect particularly when a cationic or amphoteric surfactant is used. The amount of the antistatic agent for use per 100 parts by weight of the halogen-containing resin is generally 0.01 to 10 parts by weight. When the above amount is less than 0.01, the intended effect is not obtained. When it exceeds 10 parts by weight, bleeding sometimes occurs on a resin surface undesirably to render the surface sticky.

Examples of the cationic surfactant as an antistatic agent are an aliphatic amine salt, a primary amine salt, a tertiary amine salt, a quaternary ammonium salt and an pyridinium derivative. Examples of the amphoteric surfactant as an antistatic agent are surfactant of a carboxylic acid derivative, an imidazoline derivative type, a higher alkyl amino type (betaine type), a sulfuric acid ester type, a phosphoric acid ester type and a sulfonic acid type. More specific examples of the surfactants are as follows.

Quaternary ammonium chloride of formula (1)

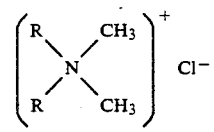

Quaternary ammonium sulfate of formula (2)

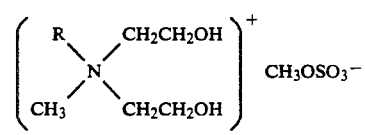

Quaternary ammonium nitrate of formula (3)

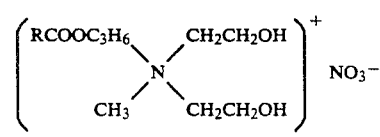

In the above formulae (1), (2) and (3), R is a linear or branched alkyl group having 2 to 22 carbon atoms or an amido group.

Alkylbetaine types of formulae (4), (5) and (6)

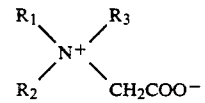

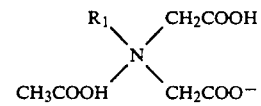

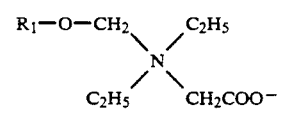

In the above formulae (4), (5) and (6), $R_1$ is a linear or branched alkyl group having 12 to 18 carbon atoms, and each of $R_2$ and $R_3$ is independently an alkyl group having 1 to 4 carbon atoms.

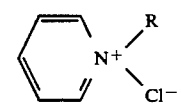

In the above formula (7), R is a linear or branched alkyl group having 12 to 20 carbon atoms.

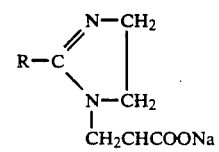

In the above formula (8), R is a linear or branched alkyl group having 12 to 18 carbon atoms.

The resin composition of the present invention may contain a variety of additives such as a generally used stabilizer containing Ca, Ba or Sr, an ultraviolet absorber, an antioxidant, and the like as required.

The present invention will be further detailed hereinbelow by reference to Examples, in which "part" stands for "part by weight" and "%", for "% by weight" unless otherwise specified.

EXAMPLE 1 AND COMPARATIVE EXAMPLE 1

Resin compositions of which the components and mixing ratios are shown below were kneaded with rolls at 180° C. for 5 minutes to obtain rolled sheets having a thickness of 1 mm. The rolled sheets were placed in a gear oven at 180° C. and examined for changes of thermal stability and coloring with time. Further, three sheets was taken from each of the rolled sheets, and stacks each of which consisted of the three sheets were respectively pressed with a pressing machine at a pressure of 100 kg/cm² under heat of 190° C. for 5 minutes to give press plates having a thickness of 1 mm. The press plates were measured for a volume resistivity at 23° C. at a relative humidity of 50% according to JIS K 6723. Table 1 shows the results.

| <Components and mixing ratio> | |
|---|---|
| Polyvinyl chloride (polymerization degree 1,300) | 100 parts |
| Dioctyl phthalate | 50 parts |
| Hydrotalcite | 2.0 parts |
| Zinc stearate | 0.3 part |
| Perchloric acid ion-containing hydrotalcite*1 | per Table 1 |
| New Elegan ASK*2 | 0.5 part |
| Stearoylbenzoylmethane ($\beta$-diketone) (SBM) | per Table 1 |

Note
*1A product prepared by surface-treating a compound having the formula of $Mg_4Al_2(OH)_{12}(CO_3)_{0.4}(ClO_4)_{1.2}\cdot 3H_2O$ with 2% by weight of sodium stearate.
Note
*2Modified aliphatic dimethylethylammonium ethosulfate supplied by Nippon Oil & Fats.

TABLE 1

| | Amount of perchloric acid ion-containing hydrotalcite (part) | SBM (part) | Volume resistivity ($\Omega \cdot$ cm) |
|---|---|---|---|
| Ex. 1-1 | 0.3 | 0 | $9.9 \times 10^{10}$ |
| Ex. 1-2 | 0.6 | 0 | $6.0 \times 10^{10}$ |
| Ex. 1-3 | 1.0 | 0 | $4.3 \times 10^{10}$ |
| Ex. 1-4 | 0.3 | 0.2 | $9.5 \times 10^{10}$ |
| Ex. 1-5 | 1.0 | 0.2 | $5.2 \times 10^{10}$ |
| CEx. 1 | 0 | 0 | $1.3 \times 10^{11}$ |

| | Thermal stability at 180° C. (minute) | | | | | | | | |
|---|---|---|---|---|---|---|---|---|---|
| | 0 | 10 | 20 | 40 | 60 | 80 | 100 | 120 | 140 | 160 |
| Ex. 1-1 | 0 | 1 | 2 | 3 | 6 | 8 | 10 | | | |
| Ex. 1-2 | 0 | 1 | 2 | 2 | 3 | 5 | 5 | 7 | 10 | |
| Ex. 1-3 | 0 | 1 | 2 | 2 | 3 | 3 | 5 | 5 | 8 | 10 |
| Ex. 1-4 | 0 | 0 | 0 | 1 | 2 | 5 | 8 | 10 | | |
| Ex. 1-5 | 0 | 0 | 0 | 1 | 2 | 3 | 5 | 5 | 8 | 10 |
| CEx. 1 | 0 | 1 | 2 | 5 | 8 | 10 | | | | |

Ex. = Example,
CEx = Comparative Example
Note:
On thermal stability, the degrees of coloring were functionally evaluated under heat for 0 to 160 minutes, and rated as follows.
0 (colorless) - 5 (yellow) - 8 (reddish brown) - 10 (black)

EXAMPLE 2 AND COMPARATIVE EXAMPLE 2

Resin compositions of which the components and mixing ratios are shown below were kneaded with rolls at 180° C. for 5 minutes to obtain rolled sheets having a thickness of 1 mm. The rolled sheets were placed in a gear oven at 200° C. and examined for changes of thermal stability and coloring with time. Further, three sheets was taken from each of the rolled sheets, and stacks each of which consisted of the three sheets were respectively pressed with a pressing machine at a pressure of 100 kg/cm² under heat of 190° C. for 5 minutes to give press plates having a thickness of 1 mm. The press plates were measured for a volume resistivity in the same manner as in Example 1. Table 2 shows the results.

| <Components and mixing ratio> | |
|---|---|
| Polyvinyl chloride (polymerization degree 1,300) | 100 parts |
| Dioctyl phthalate | 50 parts |
| Hydrotalcite | 2.0 parts |
| Zinc octylate | 0.3 part |
| Perchloric acid ion-containing hydrotalcite*1 | per Table 2 |
| MARK 1500*2 (phosphite) | 0.5 part |

Note
*1A product prepared by surface-treating a compound having the formula of $Mg_4Al_2(OH)_{12}(ClO_4)_{2.0}\cdot 3.2H_2O$ and having a BET specific surface area of 15 m²/g with 2% by weight of sodium oleate.
Note
*2Oligophosphite supplied by Adeka Argus Chemical Co., Ltd.

TABLE 2

| | Amount of perchloric acid ion-containing hydrotalcite (part) | Volume resistivity ($\Omega \cdot$ cm) |
|---|---|---|
| Ex. 2-1 | 0.3 | $1.3 \times 10^{11}$ |
| Ex. 2-2 | 1.0 | $6.8 \times 10^{10}$ |
| Ex. 2-3 | 2.0 | $1.6 \times 10^{10}$ |
| CEx. 2 | 0 | $3.8 \times 10^{13}$ |

| | Thermal stability at 200° C. (minute) | | | | | | | | |
|---|---|---|---|---|---|---|---|---|---|
| | 0 | 10 | 20 | 30 | 40 | 50 | 60 | 70 | 80 |
| Ex. 2-1 | 0 | 0 | 0 | 1 | 2 | 8 | 10 | | |
| Ex. 2-2 | 0 | 0 | 0 | 1 | 2 | 2 | 8 | 10 | |
| Ex. 2-3 | 0 | 0 | 0 | 1 | 2 | 2 | 4 | 7 | 10 |
| CEx. 2 | 0 | 0 | 0 | 0 | 3 | 8 | 10 | | |

Ex. = Example,
CEx = Comparative Example

EXAMPLE 3 AND COMPARATIVE EXAMPLE 3

Resin compositions of which the components and mixing ratios are shown below were kneaded with rolls at 180° C. for 5 minutes to obtain rolled sheets having a thickness of 0.7 mm. The rolled sheets were placed in a gear oven at 190° C. and examined for changes of thermal stability and coloring with time. Further, three sheets was taken from each of the rolled sheets, and stacks each of which consisted of the three sheets were respectively pressed with a pressing machine at a pressure of 100 kg/cm² under heat of 190° C. for 5 minutes to give press plates having a thickness of 1 mm. The press plates were measured for a volume resistivity in the same manner as in Example 1. Table 2 shows the results.

| <Components and mixing ratio> | |
|---|---|
| Polyvinyl chloride (polymerization degree 700) | 100 parts |
| Dioctyltin bisisooctylthioglycolate | 1.0 part |
| Hydrotalcite | 1.0 parts |
| Perchloric acid ion-containing hydrotalcite*1 | per Table 3 |
| Calcium stearate (Ca—St) | per Table 3 |
| Anon BF*2 | per Table 3 |

Note
*1The following hydrotalcites were used:
A = $Mg_4Al_2(OH)_{12}(CO_3)_{0.4}(ClO_4)_{1.2}\cdot 3H_2O$
B = $Mg_4Al_2(OH)_{12}(ClO_4)_{2.0}\cdot 3.2H_2O$
Note
*2Antistatic agent of an alkylbetaine type per the formula (4), supplied by Nippon Oil & Fats.

TABLE 3

| | Pperchloric acid ion-containing hydrotalcite | | Ca—St (part) | Anon BF (part) | Volume resistivity ($\Omega \cdot cm$) |
|---|---|---|---|---|---|
| | Type | Amount (part) | | | |
| Ex. 3-1 | A | 1.0 | 0 | 1.0 | $9.0 \times 10^{15}$ |
| Ex. 3-2 | B | 1.0 | 0 | 1.0 | $6.5 \times 10^{15}$ |
| Ex. 3-3 | A | 1.0 | 0.5 | 1.0 | $8.8 \times 10^{15}$ |
| CEx. 3-1 | — | — | — | 1.0 | *D |
| CEx. 3-2 | — | — | 0.5 | 1.0 | *D |
| CEx. 3-3 | — | — | — | — | $1.3 \times 10^{16}$ |

| | Thermal stabiity at 190° C. (minute) | | | | | | | | |
|---|---|---|---|---|---|---|---|---|---|
| | 0 | 5 | 10 | 15 | 20 | 30 | 40 | 50 | 60 |
| Ex. 3-1 | 0 | 0 | 1 | 2 | 3 | 7 | 10 | | |
| Ex. 3-2 | 1 | 2 | 3 | 4 | 5 | 10 | | | |
| Ex. 3-3 | 0 | 1 | 1 | 2 | 3 | 5 | 8 | 10 | |
| CEx. 3-1 | 10 | | | | | | | | |
| CEx. 3-2 | 10 | | | | | | | | |
| CEx. 3-3 | 0 | 0 | 0 | 1 | 2 | 3 | 5 | 8 | 10 |

Ex. = Example,
CEx = Comparative Example
Note
*DThe composition turned black while kneaded with rolls, and was not measurable.

What is claimed is:

1. An antistatic, thermally stabilized halogen-containing resin composition containing 100 parts by weight of a halogen-containing resin, 0.01 to 10 parts by weight of a hydrotalcite compound having the formula $$M^{2+}{}_{(1-x)}Al_x(OH)_2CO_{3(x/2)} \cdot mH_2O$$

wherein $M^{2+}$ is $Mg^{2+}$ and/or $Zn^{2+}$, x is defined by $0.1<x<0.5$ and m is defined by $0\leq m<1$, 0.01 to 10 parts by weight of a perchloric acid ion-containing hydrotalcite, and 0.01 to 5 parts by weight of at least one member selected from a $\beta$-diketone compound, an organic acid metal salt and an organic tin compound.

2. A composition according to claim 1, which further contains 0.01 to 10 parts by weight of at least one antistatic agent selected from the group consisting of a cationic surfactant, an anionic surfactant, a nonionic surfactant and an amphoteric surfactant.

3. A composition according to claim 1, wherein the perchloric acid ion-containing hydrotalcite is a compound having the formula, $$M^{2+}{}_{(1-x)}Al_x(OH)_2(CO_3)_y(ClO_4)_z \cdot mH_2O$$

wherein $M^{2+}$ is $Mg^{2+}$ and/or $Zn^{2+}$, and x, y, z and m are positive numbers satisfying the following formulae, $0<x<0.5$, $0\leq y<0.25$, $0<z\leq 0.5$, $2y+z=x$ and $0\leq m<1$.

4. A composition according to claim 1, wherein the $\beta$-diketone compound has the formula, $$R_1-CO-CHR_2-CO-R_3$$

wherein each of $R_1$ and $R_3$ is independently a linear or branched alkyl or alkenyl group having up to 30 carbon atoms, an alkyl group having 7 to 36 carbon atoms, or an aryl or alicyclic group having less than 14 carbon atoms with the proviso that the alicyclic group my contain a carbon-carbon double bond, one of $R_1$ and $R_3$ may be a hydrogen atom, and $R_2$ is a hydrogen atom, an alkyl group or an alkenyl group.

5. A composition according to claim 2, wherein the cationic surfactant is selected from the group consisting of an aliphatic amine salt, a primary amine salt, a tertiary amine salt, a quaternary ammonium salt and an pyridinium derivative.

6. A composition according to claim 2, wherein the amphoteric surfactant is selected from the group consisting of a carboxylic acid derivative, an imidazoline derivative, a higher alkyl amine, a sulfuric acid ester, a phosphoric acid ester, and a sulfonic acid ester.

7. A composition according to claim 1, wherein the organic acid metal salt is an organic acid salt of a metal selected from the group consisting of Zn, Pb, Cd, Ca, Ba and Sr.

8. A composition according to claim 6, wherein the amphoteric surfactant is a higher alkyl amine which is a betaine.

* * * * *

UNITED STATES PATENT AND TRADEMARK OFFICE
CERTIFICATE OF CORRECTION

PATENT NO. : 5,252,645
DATED : October 12, 1993
INVENTOR(S) : TSUTOMU NOSU and YOSHIYUKI NAGAE It is certified that error appears in the above-identified patent and that said Letters Patent is hereby corrected as shown below:

Column 10, line 22, change "my" to —may—;

line 29, change "an" to —a—.

Signed and Sealed this

Thirtieth Day of August, 1994

Attest:

BRUCE LEHMAN

Attesting Officer       Commissioner of Patents and Trademarks